United States Patent [19]

Bicheler et al.

[11] Patent Number: 5,178,309
[45] Date of Patent: Jan. 12, 1993

[54] INFANT CARRIER AND HARNESS COMBINATION

[75] Inventors: James P. Bicheler, Alden; Kenneth P. Morton, East Aurora, both of N.Y.

[73] Assignee: Fisher-Price, Inc., East Aurora, N.Y.

[21] Appl. No.: 789,414

[22] Filed: Nov. 1, 1991

Related U.S. Application Data

[63] Continuation of Ser. No. 581,779, Sep. 13, 1990, abandoned.

[51] Int. Cl.⁵ .......................... A45F 3/04; A45F 3/12
[52] U.S. Cl. .................................. 224/153; 224/160; 224/259; 224/264
[58] Field of Search ............... 224/151, 153, 155, 158, 224/159, 160, 161, 259, 264

[56] References Cited

U.S. PATENT DOCUMENTS

| | | | |
|---|---|---|---|
| 2,537,864 | 1/1951 | Skaer | 224/159 |
| 2,550,851 | 5/1951 | Nichols | 224/158 |
| 3,780,919 | 12/1973 | Hansson | 224/160 |
| 4,009,808 | 3/1977 | Sharp | 224/160 |
| 4,428,514 | 1/1984 | Elf | 224/151 |
| 4,568,125 | 2/1986 | Sckolnik | 297/467 |
| 4,579,264 | 4/1986 | Napolitano | 224/160 |

FOREIGN PATENT DOCUMENTS

| | | | |
|---|---|---|---|
| 2026848 | 2/1980 | United Kingdom | 224/158 |
| 2028633 | 3/1980 | United Kingdom | 224/160 |

OTHER PUBLICATIONS

"Gerry Escort" Baby Carrier, date unknown, 1 page.
Instructions for "Papoose" Baby Carrier, date unknown, 1 page.
Baby Carrier literature from "Baby Bjorn" Catalog, date unknown, 2 pages.
"Aviator" Baby Carrier advertisement, 1987, 1 page.

Primary Examiner—Henry J. Recla
Assistant Examiner—Robert M. Fetsuga
Attorney, Agent, or Firm—Cumpston & Shaw

[57] ABSTRACT

An infant carrier and harness combination in which the infant carrier is formed of a soft body having a back section for supporting the back of an infant, and spaced apart side sections and side bolsters for supporting the sides of an infant. The infant carrier has a seat section connected to the back section, and a front panel connected to the seat section for releasably connecting the front panel and seat section to the side sections, for forming a pouch for an infant. The front panel and seat section further define leg openings through which the legs of an infant can extend. A safety band extends from the lower end of one of the side sections to the lower end of the other side section. The back section is further provided with a pocket for slidably supporting a head and back support panel for stiffening the back section. The harness is further provided with shoulder straps having bib attachment straps for releasably securing a bib, in a position opposite the face of an infant in the carrier.

10 Claims, 4 Drawing Sheets

INFANT CARRIER AND HARNESS COMBINATION

This is a continuation of copending application Ser. No. 07/581,779 filed on Sep. 13, 1990, abandoned.

BACKGROUND OF THE INVENTION

1. Field of the Invention

The present invention relates generally to infant carriers, and more particularly to an improved infant carrier and harness combination.

2. Description of the Prior Art

Infant carriers in combination with harnesses are well-known in the art, of which the following patents are exemplary:

U.S. Pat. No. 2,652,183 Hlivka, Sep. 15, 1953
U.S. Pat. No. 3,229,873 Hershman, Jan. 18, 1966
U.S. Pat. No. 3,481,517 Aukerman, Dec. 2, 1969
U.S. Pat. No. 3,780,919 Hansson, Dec. 25, 1973
U.S. Pat. No. 4,139,131 Hathaway, Feb. 13, 1979
U.S. Pat. No. 4,149,687 Nunemacher, Apr. 17, 1979
U.S. Pat. No. 4,324,430 Dimas Jr., et al, Apr. 13, 1982
U.S. Pat. No. 4,402,440 Purtzer et al, Sep. 6, 1983
U.S. Pat. No. 4,568,125 Sckolnik, Feb. 4, 1986
U.S. Pat. No. 4,695,092 Hittie, Sep. 22, 1987
U.K. GB2,026,848 A, published Feb. 13, 1980
U.K. Appn. GB 2,028,633 A, published Mar. 12, 1980
U.K. Appn. GB 2,140,275 A published Nov. 28, 1984

One problem with the aforementioned prior art infant carrier and harness combinations is that a panel of the harness supports a disposable burp or dribble pad, and will become soiled if any regurgitated liquid should soak through the pad, or if the pad is inadvertently omitted.

Another problem or disadvantage of the prior art is that no safety feature is provided in the prior art to prevent an infant from falling out of the carrier in the event the waistband is insecurely fastened, or becomes detached.

Still another problem or disadvantage of the prior art is that any head or back support panel is rigidly secured to or integral with the carrier, and cannot be removed therefrom in the event the support panel interferes, for example, with placing an infant car seat restraint belt on the infant when the infant carrier is mounted in a car seat.

The improved infant carrier and harness combination of this invention is believed to eliminate these and other disadvantages of the known prior art.

SUMMARY OF THE INVENTION

An object of the present invention is to provide an improved infant carrier and harness combination comprising a pair of shoulder straps mountable on the shoulders of a person. Connecting means are provided on each of the shoulder strap for releasably securing the straps to an infant carrier at four spaced points for supporting an infant in a position facing the straps. A bib attachment means is provided on each of the spaced apart shoulder straps for releasably securing a bib therebetween in a position opposite the face of an infant in the carrier.

In more specific aspect of the invention, the bib attachment means comprises a bib strap on each shoulder strap, having one end thereof secured to the shoulder strap, and the opposite end thereof releasably connected to a bib.

Still another object of the invention is to provide an improved infant carrier comprising a soft body having a back section for supporting the back and head of an infant, and spaced apart side sections for supporting the sides of an infant. A seat section is provided connected to the back section. A front panel is connected to the seat section for connecting the front panel of seat section to the side sections to form a pouch for an infant, and to define leg openings through which the legs of an infant can extend. A safety band is provided having end portions for connecting the lower end of one of the side sections to the lower end of the other side section.

In still another aspect of the invention, the back section of the infant carrier is further provided with a pocket, and a head and back support panel is slidable into the pocket for stiffening the back section for most uses of the infant carrier. The head and back support panel may be withdrawn from the pocket to allow placing an infant car seat restraint belt on the infant, for example, when the infant carrier is mounted in a rear-facing car seat.

The invention and its objects and advantages will become more apparent from the detailed description of the preferred embodiment presented below.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Figure 1:
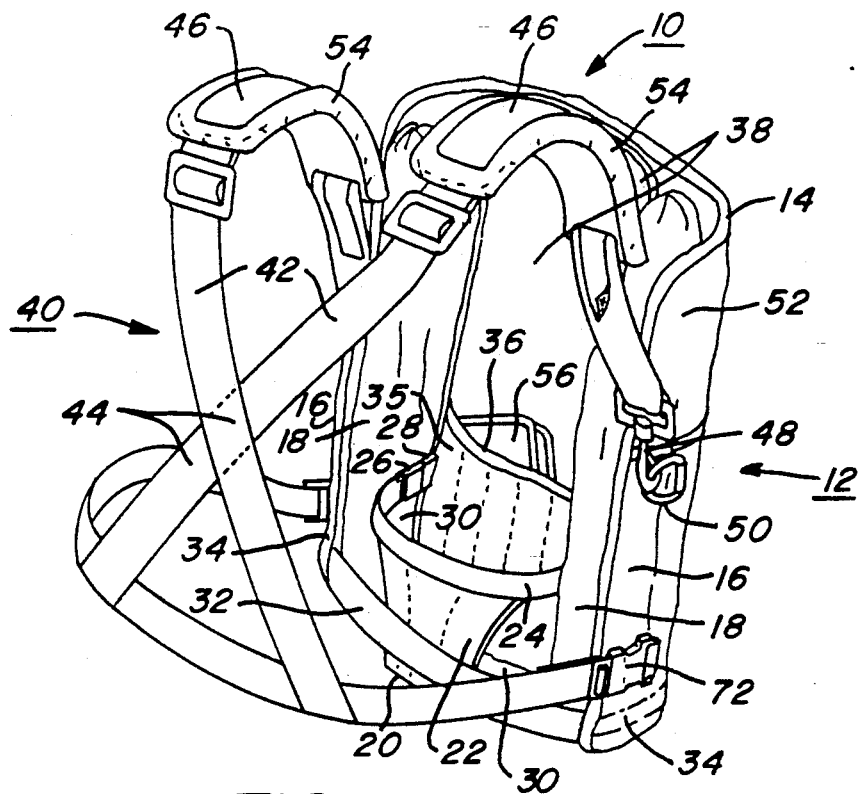
FIG. 1 is a front perspective view of a preferred embodiment of an infant carrier and harness combination of this invention.

Because certain parts of infant carrier and harness combinations are well-known, the following description is directed in particular to those elements forming, cooperating directly with, or relating to the present invention. Elements not specifically shown or described herein are selectable from those known in the pertinent art.

With reference to FIGS. 1-6, an infant carrier and harness combination 10 is disclosed, in which the infant carrier 12 comprises a unitary body formed of a soft fabric material of the type well-known in the art. The body has a back section 14 for supporting the back and head of an infant, and spaced apart side sections 16 for supporting the sides of an infant. A pair of soft padded side bolsters 18 of known type are preferably attached to the side sections 16 to limit lateral movement of the infant. A soft crotch or seat panel 20 of fabric material is connected to the lower back section 14 by any suitable means, such as stitching or snaps, not shown. A soft front panel 22 is preferably integral with the seat panel 20, and is provided with a padded waist band 24 having a buckle connector 26 or the like at each end thereof insertable into any suitable receptor 28 on the side sections 16 for releasably connecting the seat and front panels 20, 22 respectively to the side sections for forming a pouch for an infant. The seat and front panels 20, 22 further define leg openings 30 through which the legs of an infant can extend. A soft padded safety band 32 extends from one side section 16 to the other side section 16, and has opposite ends thereof integrally connected to the lower corners 34 of the side sections 16. In the event the front panel releasable connectors 26, 28 are inadvertently detached or should fail, at least one of the crotch, upper torso and arm pits of the slumping infant will engage and be supported by the seat panel 20, and/or safety band 32.

Although the safety band 32 is shown having end portions thereof integral with the side sections 16, it should be understood that the end portions could be releasably secured to the side sections.

Figure 3:
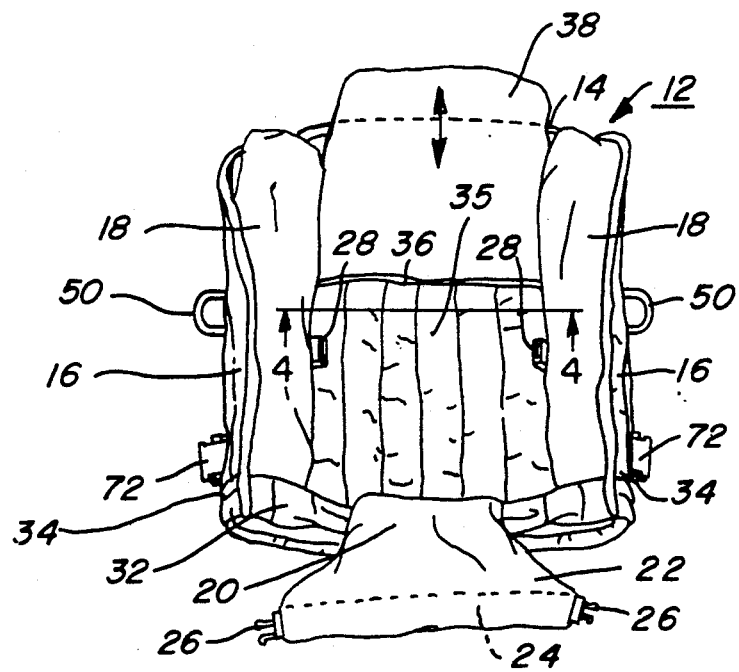
FIG. 3 is a front elevational view of the infant carrier of FIG. 1 showing the slidable back and head support panel, and the front panel in a detached condition.
Figure 4:
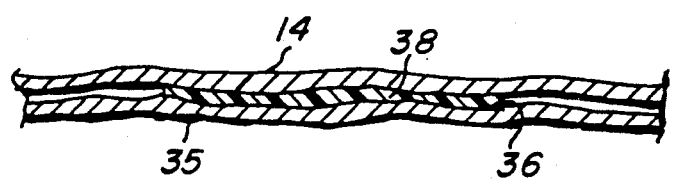
FIG. 4 is a section view taken substantially along line 4—4 of FIG. 3.

With particular reference to FIGS. 3 and 4, the back section 14 of the infant carrier 12 is shown as having an inner liner 35 forming a pocket 36 for slidably receiving a stiffener back and head support panel 38, comprising any suitable plastic foam sheet or the like.

Figure 2:
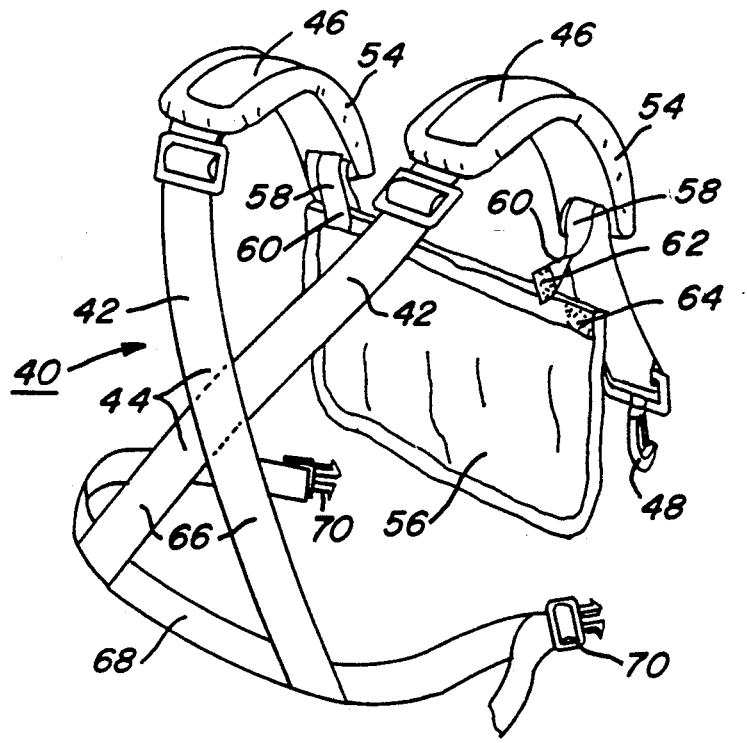
FIG. 2 is a perspective view of the harness of FIG. 1, shown releasably holding a bib.
Figure 5:
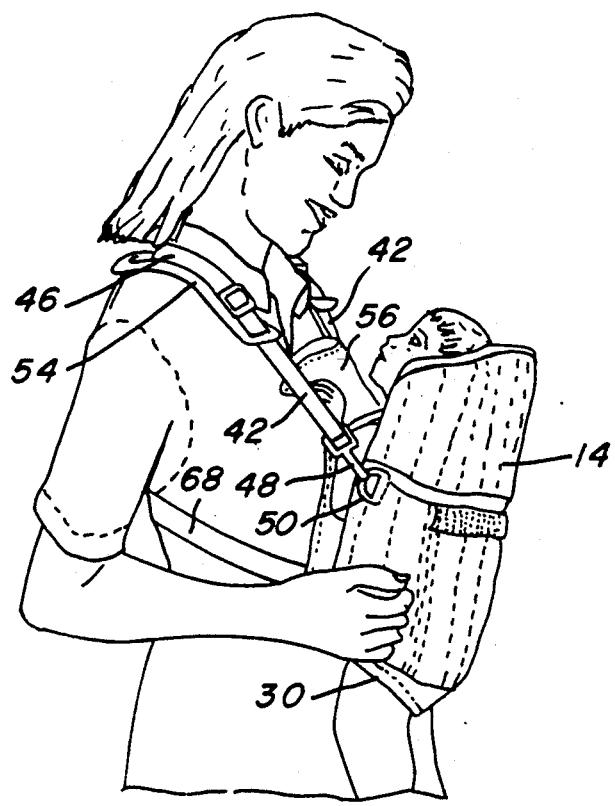
FIG. 5 is a perspective view of the infant carrier and harness combination mounted on a person, and showing the bib in an operative position and the back section of the infant carrier in an upright position.
Figure 6:
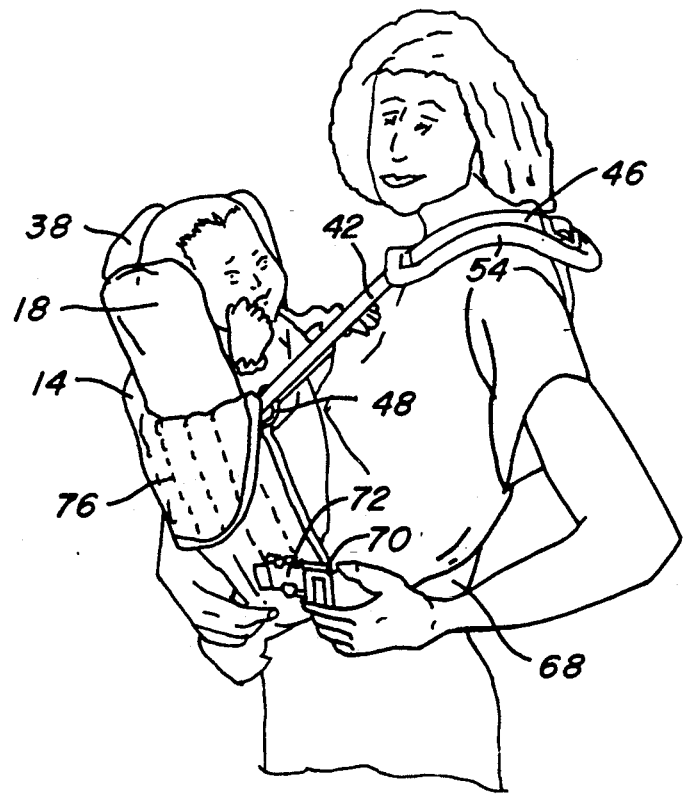
FIG. 6 is a perspective view similar to the view of FIG. 5, but taken from the opposite side, showing the bib removed, and the back section folded down upon itself.

With specific reference to FIGS. 1 and 2, the harness 40 for releasably securing the infant carrier 12 to the back of a person, as illustrated in FIGS. 5 and 6, comprises a pair of shoulder straps 42 having mid-sections 44 thereof secured together to form an X-shape. Each of the upper ends 46 of the pair of straps 42 is provided with a snap hook 48 adapted to be releasably connected to a D-ring 50 on the center outer surface 52 of the side section 16. The upper ends 46 of the shoulder straps 42 are further provided with a pair of slidable shoulder pads 54, adapted to rest on the shoulders of the person. The shoulder strap upper ends 46 are also provided with any suitable adjusting means for adjusting the length of the shoulder strap ends.

The upper ends 46 of the pair of shoulder straps 42 are further provided with bib fastening means for releasably attaching a bib 56 to the shoulder pads 42. The bib attachment means comprises a bib strap 58 on each shoulder pad having one end thereof secured to the shoulder pad by any suitable means, and the opposite end 60 thereof releasably connected to the bib 56. Preferably, the opposite end 60 of the bib strap 58 has Velcro material 62 attached thereto for engaging Velcro material 64 on the bib 56.

The opposite lower ends 66 of the pair of shoulder straps 42 are integrally connected to spaced sections of a waist strap 68. The opposite ends of the waist strap 68 are provided with adjustable connecting means, such as buckles 70, for buckling the lower strap ends to buckle receptacles 72 on the outer surface of the lower corners 34 of the side sections 16.

Referring to FIGS. 5 and 6, the infant carrier and harness combination 10 is shown mounted on the shoulders of a person. The infant carrier is positioned on the front torso of the person, with the infant facing the person. The shoulder and waist straps 42, 68 respectively are properly adjusted by known adjustment means to hold the infant against the chest of the person. In FIG. 5, a bib 56 is attached to the shoulder pads 54 of the harness 40 in a position facing the face of the infant.

Figure 7:
FIG. 7 is a front perspective view of the infant carrier with the back section folded down upon itself, the back and head support panel removed, and the infant carrier strapped in a car seat with the car seat restraint belt in place.

With reference to FIG. 7, the infant carrier 12 is shown installed in a car seat 74 mounted in a car in a rear-facing mode. Prior to placing the infant carrier 12 into the car seat 74, the upper end 76 of the back section 14 of the infant carrier is folded down, as best seen in FIG. 6, and the back and head support panel 38 is removed from the pocket 36. In this position, the car seat shoulder belts of the car seat restraint system 78 fits freely above the infant's shoulders, eliminating any interference with the shoulder belt placement or retraction.

Figure 8:
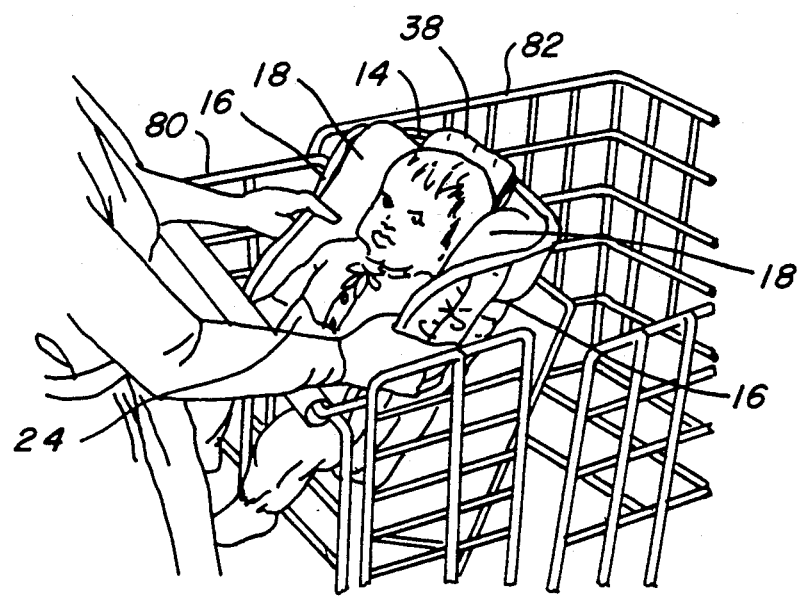
FIG. 8 is a front corner perspective view of the infant carrier mounted in a seat portion of a shopping cart.
Figure 9:
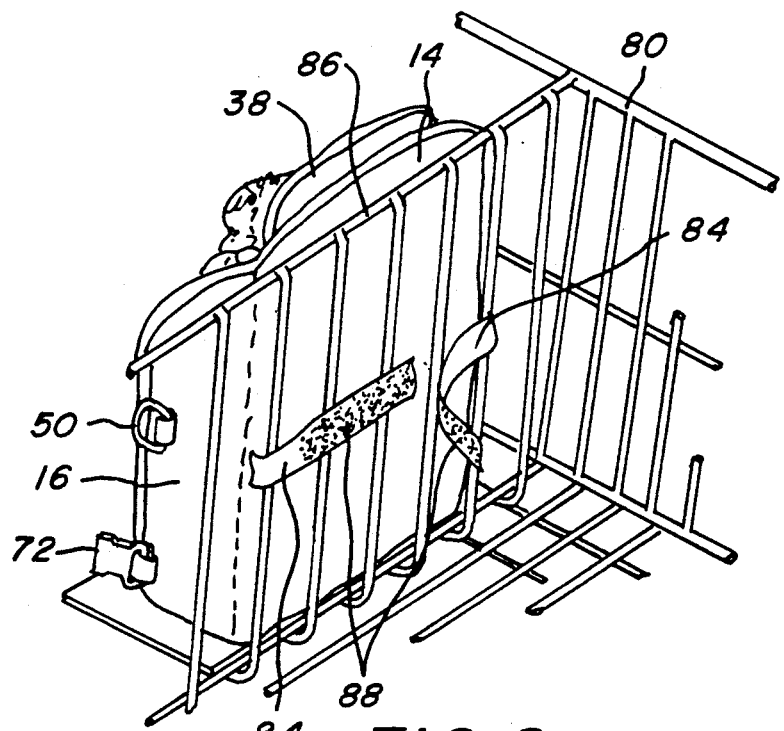
FIG. 9 is a rear perspective view of the infant carrier in position to be attached to the back of the seat portion of the shopping cart.

With reference to FIGS. 8 and 9, the infant carrier 12 is shown installed in the seat portion 80 of a shopping cart 82. The infant carrier 12 is in a semi-reclined position, and the back section 14 thereof rests on the upper rail of the seat portion 80. The carrier is provided with fastening straps 84 that are extended through the rear wire cage 86 of the shopping cart seat portion. The ends of the straps are secured together by any suitable connecting means, such as Velcro surfaces 88 on facing surfaces of the straps 84.

The bib 56 can preferably be constructed in the form of a storage pouch, within which the harness 40 and the back and head support panel 38 may be stored, when not in use.

The invention has been described in detail, with particular reference to a preferred embodiment thereof, but it will be understood that variations and modifications can be effected within the spirit and scope of the invention.

What is claimed is:

1. An improved infant carrier adapted to be attached by a harness to a person comprising:
   a soft body member having a back section for supporting the back of an infant, and spaced apart side sections for supporting the sides of an infant, the back and side sections further having lower ends;
   a seat portion connected to the lower end of the back section;
   a front panel joined to the seat portion;
   releasable connecting means on the front panel and side sections for releasably connecting the front panel and seat portion to the side sections to form a pouch defining leg openings through which the legs of an infant can extend; and
   a safety band having end portions thereof secured to the lower ends of the side sections for connecting the lower end of one of the side sections to the lower end of the other side section.

2. An improved infant carrier according to claim 1, wherein the safety band is a padded band.

3. An improved infant carrier to be adapted to be attached by a harness to a person comprising:
   a soft body member having a back section for supporting the back of an infant, and spaced apart side sections for supporting the sides of an infant, the back and side sections having lower ends;

an open-ended pocket on the back section;

a back and head support panel slidable into the pocket for stiffening the back section for most uses of the infant carrier, and withdrawing completely from the pocket to allow placing a car seat restraint belt on the infant when the infant carrier is mounted in a car;

a seat portion connected to the lower end of the back section;

a front panel connected to the seat portion;

releasable connecting means on the front panel and side sections for releasably connecting the front panel and seat portion to the side sections to form a pouch defining leg openings through which the legs of an infant can extend; and a safety band extending from one side section to the other side section, and further having end portions thereof secured to the lower ends of the side sections for connecting the lower end of one side section to the lower end of the other side section.

4. An improved infant carrier according to claim 3, wherein the safety band is a padded band.

5. An improved infant carrier according to claim 3, and further comprising a harness for the infant carrier, the harness comprising a pair of shoulder straps mountable on the shoulders of a person, connecting means on each of the shoulder straps for releasably securing the straps to the infant carrier for supporting an infant in a position facing the straps, a shoulder pad slidably mounted on each shoulder strap, and bib attachment means on each of the shoulder pads for releasably securing a bib to the pads, in a position opposite the face of an infant in the carrier.

6. An improved infant carrier according to claim 5, wherein the bib attachment means comprises a bib strap on each shoulder pad, having one end thereof secured to the shoulder pad, and the opposite end thereof releasably connected to a bib.

7. An improved infant carrier according to claim 6, wherein the bib has hook and loop fastener material thereon, and wherein the opposite end of the bib strap has complimentary hook and loop fastener material attached thereto for engaging the hook and loop fastener material on the bib.

8. An improved harness separate from but releasably securable to an infant carrier comprising:

a pair of shoulder straps mountable on the shoulders of a person;

a pair of shoulder pads, one slidably mounted on each of the shoulder straps;

connecting means on each of the shoulder straps for releasably securing the straps in spaced apart relation to the infant carrier for supporting an infant in a position facing the straps; and bib attachment means mounted on each of the shoulder pads and completely unconnected from the carrier for releasably securing a free hanging bib therebetween in a position opposite the face of an infant in the carrier when the carrier containing the infant is secured to the harness.

9. An improved harness according to claim 8 wherein the bib attachment means comprises a bib strap on each shoulder pad, having one end thereof secured to the shoulder pad, and the opposite end thereof releasably connected to a free hanging bib.

10. An improved harness according to claim 9, wherein the free hanging bib has hook and loop fastener material thereon, and wherein the opposite end of the bib strap has complimentary hook and look fastener material attached thereto for engaging the fastener material on the free hanging bib.

* * * * *